US012031109B2

(12) United States Patent
Nomura et al.

(10) Patent No.: US 12,031,109 B2
(45) Date of Patent: Jul. 9, 2024

(54) HYDROPHILIZATION TREATMENT AGENT COMPOSITION

(71) Applicant: KAO CORPORATION, Tokyo (JP)

(72) Inventors: Takayuki Nomura, Tokyo (JP); Takanori Saito, Tokyo (JP)

(73) Assignee: KAO CORPORATION, Tokyo (JP)

( * ) Notice: Subject to any disclaimer, the term of this patent is extended or adjusted under 35 U.S.C. 154(b) by 485 days.

(21) Appl. No.: 17/420,170

(22) PCT Filed: Nov. 20, 2019

(86) PCT No.: PCT/JP2019/045445
§ 371 (c)(1),
(2) Date: Jul. 1, 2021

(87) PCT Pub. No.: WO2020/166161
PCT Pub. Date: Aug. 20, 2020

(65) Prior Publication Data
US 2022/0089972 A1    Mar. 24, 2022

(30) Foreign Application Priority Data

Feb. 13, 2019   (JP) ................................. 2019-023593

(51) Int. Cl.
| | | |
|---|---|---|
| *C11D 1/12* | (2006.01) | |
| *C11D 1/62* | (2006.01) | |
| *C11D 1/65* | (2006.01) | |
| *C11D 3/00* | (2006.01) | |
| *C11D 3/30* | (2006.01) | |
| *C11D 3/34* | (2006.01) | |
| *C11D 1/14* | (2006.01) | |
| *C11D 1/28* | (2006.01) | |
| *C11D 1/29* | (2006.01) | |

(52) U.S. Cl.
CPC .............. *C11D 3/0036* (2013.01); *C11D 1/12* (2013.01); *C11D 1/65* (2013.01); *C11D 3/30* (2013.01); *C11D 3/3409* (2013.01); *C11D 1/123* (2013.01); *C11D 1/143* (2013.01); *C11D 1/28* (2013.01); *C11D 1/29* (2013.01); *C11D 1/62* (2013.01); *C11D 2111/18* (2024.01)

(58) Field of Classification Search
CPC .. C11D 1/123; C11D 1/12; C11D 1/62; C11D 1/65; C11D 3/3409; C11D 3/30
USPC .................... 510/238, 427, 433, 504
See application file for complete search history.

(56) References Cited

U.S. PATENT DOCUMENTS

| | | | |
|---|---|---|---|
| 5,853,707 A | 12/1998 | Wells et al. | |
| 2003/0190302 A1 | 10/2003 | Frantz et al. | |
| 2005/0164903 A1 | 7/2005 | Ko et al. | |
| 2006/0217286 A1 | 9/2006 | Geffroy et al. | |
| 2008/0033106 A1 | 2/2008 | Koroskenyi et al. | |
| 2014/0080746 A1 | 3/2014 | Doi et al. | |
| 2018/0010069 A1* | 1/2018 | Man ..................... | C11D 3/2075 |
| 2019/0390137 A1 | 12/2019 | Morikawa et al. | |
| 2020/0048582 A1 | 2/2020 | Morikawa et al. | |
| 2021/0102144 A1 | 4/2021 | Nomura | |
| 2021/0145720 A1 | 5/2021 | Morishima | |

FOREIGN PATENT DOCUMENTS

| | | |
|---|---|---|
| CA | 1337586 C | 11/1995 |
| CN | 102703233 A | 10/2012 |
| CN | 102703233 B | 9/2013 |
| EP | 0363855 A1 | 4/1990 |
| EP | 3467079 A1 | 4/2019 |
| JP | 03-184908 A | 8/1991 |
| JP | 2001181601 A | 7/2001 |
| JP | 2005508400 A | 3/2005 |
| JP | 2005518389 A | 6/2005 |
| JP | 2006514150 A | 4/2006 |
| JP | 2009545642 A | 12/2009 |
| JP | 2012025820 A | 2/2012 |
| JP | 2015027974 A | 2/2015 |
| JP | 2015105313 A | 6/2015 |
| JP | 2017190381 A | 10/2017 |
| JP | 2017214578 A | 12/2017 |
| JP | 201866102 A | 4/2018 |
| JP | 2018104880 A | 7/2018 |
| TW | 412424 B | 11/2000 |
| WO | WO-03016448 A1 | 2/2003 |
| WO | WO-2017209114 A1 | 12/2017 |
| WO | 2019022046 A1 | 1/2019 |
| WO | WO-2019013322 A1 | 1/2019 |

OTHER PUBLICATIONS

Extended European Search Report issued Nov. 28, 2022 in Patent Application No. 19915008.7, 6 pages.
English translation of the International Preliminary Report on Patentability and Written Opinion issued Aug. 26, 2021 in PCT/JP2019/045445, 7 pages.
Combined Office Action and Search Report issued Mar. 21, 2023 in Taiwanese Patent Application No. 108142214, 7 pages.
International Search Report issued Jan. 7, 2020 in PCT/JP2019/045445 (with English translation), 5 pages.
J. Stapersma et al., "Hydroxy Alkane Sulfonate (HAS), a New Surfactant Based on Olefins", J. Am. Oil. Chem. Soc., vol. 69, No. 1, Jan. 1992, pp. 39-43.

(Continued)

*Primary Examiner* — Gregory R Delcotto

(74) *Attorney, Agent, or Firm* — Element IP, PLC

(57) ABSTRACT

The present invention is a hydrophilization treatment agent composition containing (A) a branched anionic surfactant, (B) a di-long chain hydrocarbon cationic surfactant, and water, wherein a molar ratio of (B) to a total of (A) and (B), (B)/[(A)+(B)], is 0.1 or more and 0.8 or less.

13 Claims, No Drawings

(56) References Cited

OTHER PUBLICATIONS

Office Action and Search Report issued Jul. 18, 2023 in Taiwanese Patent Application No. 108142214, 7 pages.

* cited by examiner

HYDROPHILIZATION TREATMENT AGENT COMPOSITION

FIELD OF THE INVENTION

The present invention relates to a hydrophilization treatment agent composition and a method for hydrophilizing a solid surface.

BACKGROUND OF THE INVENTION

Conventionally, as methods for imparting antisoiling properties or decontaminating properties to solid surfaces, relatively distinct methods have been known: water repellent treatment and hydrophilization treatment.

Water repellent treatment is a technique of performing surface treatment for making a solid surface such as glass, metal, fiber or the like water repellant to prevent dirt contained in water from adhering thereto. For example, it has been widely performed to treat clothes with a fabric softener after washing, to spray water repellent on ski wear or the like to impart a waterproofing effect thereto, or to wax painted surfaces of automobiles.

However, as it is difficult to make surfaces completely water repellent by water repellent treatment, and the repeated contact of solid surfaces with water causes dirt contained in the water to accumulate thereon, an antisoiling effect is difficult to fully exhibit, and reduction in a decontaminating effect may also occur, which results in the adhered dirt becoming harder to remove.

On the other hand, if solid surfaces are subjected to hydrophilization treatment, that is, the treatment of decreasing the contact angle of solid surfaces relative to water to make the solid surfaces easy to get wet with water, dirt adhering to the solid surfaces after the said treatment becomes easier to remove when washed, or a recontamination prevention effect against dirt can be expected, and in addition, the followings can be expected: an anti-fogging effect on glass, mirrors or the like; an antistatic effect; frost prevention on aluminum fins of heat exchangers; and imparting antisoiling properties, decontaminating properties or the like to surfaces of bathtubs, toilets and the like.

As treatment agents and methods for hydrophilizing solid surfaces, several proposals have been made.

For example, JP-A 2001-181601 discloses an aqueous antisoiling composition containing an amphoteric polyelectrolyte. JP-A 2006-514150 discloses a cleaning or rinsing composition containing a surfactant and a specific polybetaine. JP-A 2012-25820 discloses a hydrophilization treatment agent composition containing an acrylic resin obtained by copolymerizing a polymerizable unsaturated monomer having a specific betaine structure and a specific polymerizable unsaturated monomer, hydrophilic crosslinked polymer particles and a crosslinking agent. JP-A 2009-545642 discloses a method for improving the wettability/hydrophilicity of a hydrophobic substrate including the step of applying a composition including an amphiphilic block copolymer to the substrate, wherein the amphiphilic block copolymer contains a hydrophilic block with a specific structure and a hydrophobic block formed of an ethylenically unsaturated hydrophobic monomer. JP-A 2015-105313 discloses a hydrophilization treatment agent composed of a block polymer A having a polymer segment A-1 derived from an unsaturated monomer including a repeating unit derived from a hydrophobic unsaturated monomer and a polymer segment A-2 derived from an unsaturated monomer including a repeating unit derived from an unsaturated monomer having a sulfobetaine group, wherein the content of the polymer segment A-1 is 0.05 mass % or more and 75 mass % or less. JP-A 2017-190381 discloses a surface treatment agent composed of a copolymer including a specific constituting unit (A) having a betaine group and a specific constituting unit (B) having a cationic group. JP-A 2018-66102 discloses a fiber modifier composed of an internal olefin sulfonate having 17 or more and 24 or less carbons, and a finishing agent composition for textile products containing the same.

On the other hand, it has been performed to formulate surfactant-containing compositions capable of being used as shampoo or used for washing bodies, clothes or the like with combinations of anionic surfactants and cationic surfactants. JP-A H3-184908 discloses a shampoo composition containing a specific 1-hydroxy-2-pyridone compound, an anionic surfactant, a quaternary nitrogen-containing cationic compound and a water-insoluble oil. JP-A 2005-508400 discloses a surfactant system comprising an anionic surfactant, a specific cationic compound and a non-ionic surfactant. JP-A 2005-518389 discloses an aqueous free flowing composition comprising: (a) at least one anionic surfactant comprising an alkyl sulfate or alkyl ether sulfate; (b) at least one cationic surfactant comprising a quaternary ammonium compound having four substituent groups selected from the group consisting of hydrocarbons and hydrogen, wherein at least one of the groups is a hydrocarbon; and (c) water, wherein the at least one anionic surfactant and the at least one cationic surfactant are present in a combined amount such that the composition possesses non-Newtonian shear thinning properties and a stable viscosity under at least one freeze/thaw cycle.

SUMMARY OF THE INVENTION

In the hydrophilization treatment of solid surfaces, superior hydrophilizing capability and favorable finish of solid surfaces after treatment are desirable. For example, for solid surfaces made of transparent materials such as glass and the like, the ability of hydrophilizing without loss of transparency is desirable.

The present invention provides a hydrophilization treatment agent composition and a method for hydrophilizing solid surfaces, which exhibit excellent hydrophilizing capability for various solid surfaces such as hard surfaces and the like and do not impair the condition of solid surfaces after hydrophilization treatment.

The present invention relates to a hydrophilization treatment agent composition containing (A) a branched anionic surfactant, (B) a di-long chain hydrocarbon cationic surfactant, and water, wherein a molar ratio of (B) to a total of (A) and (B), (B)/[(A)+(B)], is 0.1 or more and 0.8 or less.

In addition, the present invention relates to a method for hydrophilizing a solid surface, wherein the solid surface is contacted with a treatment liquid containing (A) a branched anionic surfactant, (B) a di-long chain hydrocarbon cationic surfactant, and water, in which a molar ratio of (B) to a total of (A) and (B), (B)/[(A)+(B)], is 0.1 or more and 0.8 or less.

Hereinafter, branched anionic surfactant (A) is referred to as component (A) and di-long chain hydrocarbon cationic surfactant (B) as component (B) to give an explanation.

According to the present invention, provided are a hydrophilization treatment agent composition and a method for hydrophilizing solid surfaces, which exhibit excellent hydrophilizing capability for various solid surfaces such as hard surfaces and the like and do not impair the condition of solid surfaces after hydrophilization treatment.

EMBODIMENTS OF THE INVENTION

[Hydrophilization Treatment Agent Composition]

Component (A) is a branched anionic surfactant. A branched anionic surfactant is an anionic surfactant whose hydrocarbon group, which is the hydrophobic part, has a branched structure. Note that, in the present invention, when an anionic surfactant has a hydrocarbon group whose carbon atom bonded to the anionic group which is the hydrophilic part is a secondary or tertiary carbon atom, it may also be regarded as an anionic surfactant having a branched structure.

Examples of component (A) include an anionic surfactant having a branched chain hydrocarbon group with 10 or more and 30 or less carbons.

Examples of component (A) include an anionic surfactant having a branched chain hydrocarbon group with 10 or more and 30 or less carbons and a sulfate group or a sulfonic acid group.

The branched chain hydrocarbon group may include a substituent such as a hydroxyl group or the like or a linking group such as a COO group or the like. The number of carbons in the substituent or linking group is not included in the number of carbons in the branched chain hydrocarbon group.

The sulfate group and sulfonic acid group may be salts, for example, alkali metal salts, alkaline earth metal salts, ammonium salts or amine salts.

The branched chain hydrocarbon group of component (A) has preferably 10 or more, more preferably 16 or more and further preferably 18 or more, and preferably 30 or less, more preferably 28 or less, further preferably 24 or less and furthermore preferably 22 or less carbons from the viewpoint of hydrophilizing solid surfaces.

Examples of the branched chain hydrocarbon group of component (A) include a branched chain alkyl group, a branched chain alkenyl group and an aryl group having a branched chain alkyl group.

Examples of component (A) include an anionic surfactant represented by the following general formula (A):

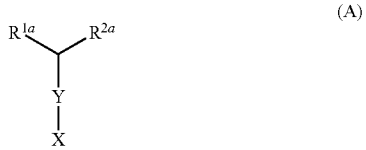

wherein each of $R^{1a}$ and $R^{2a}$ independently represents a hydrocarbon group with 1 or more and 28 or less carbons which may include a substituent or a linking group; X represents a group selected from $SO_3M$, COOM and $OSO_3M$; and M represents a counter ion.

In the formula (A), examples of the hydrocarbon group of each of $R^{1a}$ and $R^{2a}$ include an alkyl group, an alkenyl group and an aryl group. An alkyl group or an alkenyl group is preferable from the viewpoint of hydrophilizing solid surfaces.

The hydrocarbon group of each of $R^{1a}$ and $R^{2a}$ may include a substituent such as a hydroxyl group or the like or a linking group such as a COO group or the like.

The total of the numbers of carbons in $R^{1a}$ and $R^{2a}$ is preferably 9 or more, more preferably 15 or more and further preferably 17 or more, and preferably 29 or less, more preferably 27 or less, further preferably 23 or less and furthermore preferably 21 or less from the viewpoint of hydrophilizing solid surfaces. Note that the numbers of carbons in the substituents or linking groups are not included in the numbers of carbons in the hydrocarbon groups of $R^{1a}$ and $R^{2a}$.

In the formula (A), X is preferably $SO_3M$.

In the formula (A), examples of M include an alkali metal ion, an alkaline earth metal (½ atom) ion, an ammonium ion or an organic ammonium ion. M is preferably an alkali metal ion, more preferably a sodium ion and a potassium ion and further preferably a potassium ion.

Examples of component (A) include one or more branched anionic surfactants selected from an internal olefin sulfonate salt (IOS), a secondary alkane sulfonate salt (SAS) and a dialkyl sulfosuccinate salt (DASS).

Component (A) is preferably an IOS from the viewpoint of hydrophilizing solid surfaces, for example, hard surfaces. An IOS with 10 or more, further 16 or more and further 18 or more, and 30 or less, further 28 or less, further 24 or less and further 22 or less carbons is preferable. This number of carbons is the number of carbons expressed in terms of an acid-type compound. Examples of a salt of the IOS is an alkali metal salt, an alkaline earth metal (½ atom) salt, an ammonium salt or an organic ammonium salt from the viewpoint of hydrophilizing solid surfaces. Examples of the alkali metal salt include a sodium salt and a potassium salt. Examples of the alkaline earth metal salt include a calcium salt and a magnesium salt. Examples of the organic ammonium salt include an alkanol ammonium salt with 2 or more and 6 or less carbons. The salt of the IOS is preferably an alkali metal salt and more preferably a potassium salt.

The IOS of the present invention can be obtained by sulfonating, neutralizing and hydrolyzing an internal olefin whose double bond is internal to (at position 2 or higher of) the olefin chain, and the like. The sulfonation of the internal olefin causes S-sultone to be quantitatively produced, and some of the R-sultone changes into γ-sultone and olefin sulfonic acid, which further convert into a hydroxy alkane sulfonate salt (H species) and an olefin sulfonate salt (O species) during the neutralization and hydrolysis processes (e.g., J. Am. Oil Chem. Soc. 69, 39 (1992)). The IOS is a mixture of them and mainly a sulfonate salt whose sulfonic acid group is internal to (at position 2 or higher of) the carbon chain (a hydroxy alkane chain in the H species or an olefin chain in the O species). The substitution position distribution of the sulfonic acid groups in the carbon chains in the IOS can be quantified by such a method as gas chromatography, nuclear magnetic resonance spectroscopy or the like.

In the IOS, the proportion of an IOS whose sulfonic acid group is present at position 2 of the aforementioned carbon chains is preferably 5% or more and more preferably 10% or more, and preferably 45% or less and more preferably 30% or less on a molar basis or mass basis from the viewpoint of hydrophilizing solid surfaces.

In the IOS, the proportion of an IOS whose sulfonic acid group is present at position 1 of the aforementioned carbon chains is preferably 0.2% or more, more preferably 0.5% or more and further preferably 1.0% or more, and preferably 20% or less, more preferably 10% or less, further preferably 5% or less and furthermore preferably 3% or less on a molar basis or mass basis from the viewpoint of hydrophilizing solid surfaces.

The hydrophilization treatment agent composition of the present invention more preferably contains an IOS with 18 or more and 22 or less carbons as component (A).

In the IOS, the proportion of an IOS with 16 or more and 24 or less carbons is preferably 50 mass % or more, more preferably 70 mass % or more, further preferably 80 mass % or more, furthermore preferably 90 mass % or more, furthermore preferably 95 mass % or more and furthermore preferably 97 mass % or more, and preferably 100 mass % or less and may be 100 mass % from the viewpoint of hydrophilizing solid surfaces.

In the IOS, the molar ratio of the H species to the O species (H species/C species) is preferably more than 50/50 and more preferably more than 70/30, and preferably 95/5 or less and more preferably 90/10 or less from the viewpoint of hydrophilizing solid surfaces.

The SAS has a hydrocarbon group whose carbon atom bonded to the sulfonic acid group which is the hydrophilic group is a secondary carbon atom. The hydrocarbon group in the SAS has preferably 10 or more and more preferably 12 or more, and preferably 22 or less and more preferably 20 or less carbons from the viewpoint of hydrophilizing solid surfaces.

In the DASS, the alkyl group is preferably a branched chain alkyl group. While the DASS includes two alkyl groups, the alkyl groups each have preferably 6 or more and more preferably 8 or more, and preferably 18 or less and more preferably 16 or less carbons from the viewpoint of hydrophilizing solid surfaces. While the DASS includes two COO groups, the numbers of carbons therein are not included in the number of carbons of the branched structure which the DASS has.

Component (A) is preferably one or more branched anionic surfactants selected from an internal olefin sulfonate salt with 10 or more and 30 or less carbons, a secondary alkane sulfonate salt with 10 or more and 22 or less carbons and a dialkyl sulfosuccinate salt whose alkyl groups each have 6 or more and 18 or less carbons, and more preferably one or more branched anionic surfactants selected from an internal olefin sulfonate salt with 10 or more and 30 or less carbons from the viewpoints of the hydrophilization of solid surfaces and the finish of solid surfaces.

The hydrophilization treatment agent composition of the present invention contains component (A) in an amount of preferably 0.001 mass % or more, more preferably 0.005 mass % or more and further preferably 0.01 mass % or more, and preferably 60 mass % or less, more preferably 40 mass % or less, further preferably 25 mass % or less, furthermore preferably 10 mass % or less and furthermore preferably 5 mass % or less from the viewpoints of the hydrophilization of solid surfaces and the finish of solid surfaces. Note that mass % of component (A) is based on an amount expressed in terms of a compound whose anionic group is not neutralized, i.e., an acid-type compound (the same applies hereinafter).

Component (B) is a di-long chain hydrocarbon cationic surfactant. The di-long chain hydrocarbon cationic surfactant may be a cationic surfactant having two long chain hydrocarbon groups in a single molecule. Component (B) is preferably a cationic surfactant having hydrophobic groups composed of two long chain hydrocarbon groups and one hydrophilic group. Each of the long chain hydrocarbon groups in component (B) has preferably 6 or more and 14 or less carbons.

Examples of component (B) include a cationic surfactant having two hydrocarbon groups with 6 or more and 14 or less carbons from the viewpoints of the hydrophilization of solid surfaces and the finish of solid surfaces.

Examples of component (B) include a quaternary ammonium salt cationic surfactant having two hydrocarbon groups with 6 or more and 14 or less carbons [each of which is also referred to as long chain hydrocarbon group (B) hereinafter] from the viewpoints of the hydrophilization of solid surfaces and the finish of solid surfaces.

Examples of long chain hydrocarbon group (B) include an aliphatic hydrocarbon group with 6 or more and 14 or less carbons [hereinafter also referred to as aliphatic hydrocarbon group (B1)] and an aromatic hydrocarbon group with 6 or more and 14 or less carbons [hereinafter also referred to as aromatic hydrocarbon group (B2)].

Aliphatic hydrocarbon group (B1) is preferably linear. Examples of aliphatic hydrocarbon group (B1) include an alkyl group and an alkenyl group. The alkyl group and alkenyl group are preferably linear. The upper limit of the number of carbons in aliphatic hydrocarbon group (B1) is preferably 12 or less, more preferably 10 or less and further preferably 8 or less from the viewpoint of the finish of solid surfaces. Aliphatic hydrocarbon group (B1) has preferably 8 carbons.

Examples of aromatic hydrocarbon group (B2) include an aralkyl group and an aryl group. Examples of the aralkyl group include a benzyl group and a phenethyl group, and a benzyl group is preferable. The aryl group may be a substituted aryl group. When a substituent of the substituted aryl group is a hydrocarbon group, the number of carbons thereof is included in the number of carbons of the aryl group. Examples of the aryl group include a phenyl group, a tolyl group and a xylyl group. The upper limit of the number of carbons in aromatic hydrocarbon group (B2) is preferably 12 or less, more preferably 10 or less and further preferably 8 or less from the viewpoint of the finish of solid surfaces. Aromatic hydrocarbon group (B2) has preferably 7 or 8 carbons and more preferably 7 carbons.

Long chain hydrocarbon group (B) is preferably a group selected from an alkyl group, an alkenyl group and an aralkyl group.

Component (B) is preferably a quaternary ammonium salt having two groups each of which is selected from an alkyl group with 6 or more and 14 or less carbons, an alkenyl group with 6 or more and 14 or less carbons and an aralkyl group with 6 or more and 14 or less carbons from the viewpoints of the hydrophilization of solid surfaces and the finish of solid surfaces.

Component (B) is more preferably a quaternary ammonium salt having two groups each of which is selected from an alkyl group with 6 or more and 14 or less carbons, an alkenyl group with 6 or more and 14 or less carbons and an aralkyl group with 6 or more and 14 or less carbons, the quaternary ammonium salt having at least one alkyl group or further linear alkyl group with 6 or more and 14 or less carbons from the viewpoints of the hydrophilization of solid surfaces and the finish of solid surfaces.

A cationic surfactant represented by the following general formula (B) is preferable as (B):

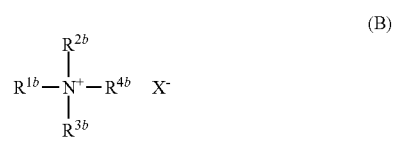

(B)

$$R^{1b}-\underset{\underset{R^{3b}}{|}}{\overset{\overset{R^{2b}}{|}}{N^+}}-R^{4b} \quad X^-$$

wherein two of $R^{1b}$, $R^{2b}$, $R^{3b}$ and $R^{4b}$ are hydrocarbon groups with 6 or more and 14 or less carbons and the remaining two are hydrocarbon groups with 1 or more and 3 or less carbons; and $X^-$ is a counter ion.

In the general formula (B), each of the hydrocarbon groups with 6 or more and 14 or less carbons, which are two of $R^{1b}$, $R^{2b}$, $R^{3b}$ and $R^{4b}$, is long chain hydrocarbon group (B), and specific groups and preferable modes thereof are as mentioned above. In the general formula (B), at least one of $R^{1b}$, $R^{2b}$, $R^{3b}$ and $R^{4b}$ is preferably an alkyl group and further linear alkyl group with 6 or more and 14 or less carbons.

In the general formula (B), examples of each of the hydrocarbon groups with 1 or more and 3 or less carbons, which are the remaining two of $R^{1b}$, $R^{2b}$, $R^{3b}$ and $R^{4b}$, include an alkyl group, and a methyl group is preferable.

In the general formula (B), $X^-$ is a counter ion, and specific examples thereof include one or more counter ions selected from an alkyl sulfate ion with 1 or more 3 or less carbons, a sulfate ion, a phosphate ion, a fatty acid ion with 1 or more and 3 or less carbons and a halide ion. Among these, one or more selected from an alkyl sulfate ion with 1 or more and 3 or less carbons, a sulfate ion and a halide ion is preferable, and a halide ion is more preferable from the viewpoints of ease of production and the availability of raw materials. Exemplary halide ions are a fluoride ion, a chloride ion, a bromide ion and an iodide ion.

In the hydrophilization treatment agent composition of the present invention, the molar ratio of component (B) to the total of components (A) and (B), (B)/[(A)+(B)], is 0.1 or more, preferably 0.2 or more and more preferably 0.3 or more from the viewpoint of the hydrophilization of solid surfaces, and 0.8 or less, preferably 0.7 or less, more preferably 0.6 or less, further preferably 0.5 or less and furthermore preferably 0.4 or less from the same viewpoint. Note that the number of moles of component (A) in the molar ratio of (B)/[(A)+(B)] is based on an amount expressed in terms of a compound whose anionic group is not neutralized, i.e., an acid-type compound.

The hydrophilization treatment agent composition of the present invention preferably contains (C) a polyvalent metal ion [hereinafter referred to as component (C)] from the viewpoint of hydrophilizing solid surfaces.

Examples of the polyvalent metal ion of component (C) include a divalent or more and trivalent or less metal ion, and a divalent metal ion is preferable.

Component (C) is preferably an ion of an element in group 2 and more preferably one or more selected from a calcium (Ca) ion and a magnesium (Mg) ion from the viewpoint of hydrophilizing solid surfaces under coexistence with component (A). Component (C) preferably includes a Ca ion. Component (C) more preferably includes a Ca ion and an Mg ion. When component (C) includes a Ca ion and an Mg ion, the molar ratio of Ca ion/Mg ion is preferably 5/5 or more and more preferably 7/3 or more, and preferably 9/1 or less.

The present invention includes a hydrophilization treatment agent composition containing (A) a branched anionic surfactant [component (A)], (B) a di-long chain hydrocarbon cationic surfactant, (C1) one or more ions selected from a Ca ion and an Mg ion [hereinafter referred to as component (C1)], and water, wherein the molar ratio of component (B) to the total of components (A) and (B), (B)/[(A)+(B)], is 0.1 or more and 0.8 or less from the viewpoint of hydrophilizing solid surfaces, and the molar ratio of component (C1) to component (A), (C1)/(A), is 0.2 or more and 10 or less from the viewpoints of the hydrophilization of solid surfaces and the finish of solid surfaces. All the descriptions herein can also be applied to this hydrophilization treatment agent composition by reading component (C) as component (C1).

The present invention includes a hydrophilization treatment agent composition containing (A1) an IOS [hereinafter referred to as component (A1)], (B) a di-long chain hydrocarbon cationic surfactant, (C1) one or more ions selected from a Ca ion and an Mg ion [hereinafter referred to as component (C1)], and water, wherein the molar ratio of component (B) to the total of components (A) and (B), (B)/[(A)+(B)], is 0.1 or more and 0.8 or less from the viewpoint of hydrophilizing solid surfaces, and the molar ratio of component (C1) to component (A1), (C1)/(A1), is 0.2 or more and 10 or less from the viewpoints of the hydrophilization of solid surfaces and the finish of solid surfaces.

All the descriptions herein can also be applied to these hydrophilization treatment agent compositions by reading component (A) as component (A1) and component (C) as component (C1).

Component (C) may be incorporated into the hydrophilization treatment agent composition of the present invention, for example, by using a water-soluble polyvalent metal salt as a formulation component thereof. In addition, it may be incorporated into the hydrophilization treatment agent composition of the present invention by using water containing a hardness component corresponding to component (C) as a raw material of the composition.

When the hydrophilization treatment agent composition of the present invention contains component (C), the molar ratio of component (C) to the total of components (A) and (B), (C)/[(A)+(B)], is preferably 0.2 or more, more preferably 0.3 or more and further preferably 0.4 or more from the viewpoint of hydrophilizing solid surfaces, and preferably 4 or less, more preferably 3 or less and further preferably 2 or less from the viewpoint of the finish of solid surfaces. Note that the number of moles of component (A) in the molar ratio of (C)/[(A)+(B)] is based on an amount expressed in terms of a compound whose anionic group is not neutralized, i.e., an acid-type compound.

In addition to components (A) and (B), the hydrophilization treatment agent composition of the present invention can contain as a further optional component other than component (C) an anionic surfactant other than component (A), a nonionic surfactant, an amphoteric surfactant, a solvent, an oil agent or the like. Examples of the solvent include butyldiglycol, dipropylene glycol, ethanol and the like. Examples of the oil agent include phenylglycol, benzyl alcohol and the like.

The hydrophilization treatment agent composition of the present invention contains water. Water is usually the balance of a composition and is contained in such an amount that makes the total 100 mass %. The hydrophilization treatment agent composition of the present invention is preferably a liquid composition.

The pH of the hydrophilization treatment agent composition of the present invention at 20° C. is preferably 3 or more, more preferably 4 or more and further preferably 5 or more, and preferably 12 or less, more preferably 10 or less and further preferably 9 or less from the viewpoints of the hydrophilization of solid surfaces and the finish of solid surfaces.

The viscosity of the hydrophilization treatment agent composition of the present invention at 20° C. is preferably 1 mPa·s or more and more preferably 2 mPa·s or more, and preferably 10000 mPa·s or less and more preferably 5000 mPa·s or less from the viewpoints of the hydrophilization of solid surfaces and the finish of solid surfaces. This viscosity can be measured using a B-type viscometer (manufactured by Toki Sangyo Co., Ltd., "TVB-10M") with a rotor and rotation speed depending on viscosity. When the viscosity of the composition is so low that it cannot be measured with the B-type viscometer, it can be measured using a rheometer (manufactured by Anton Paar GmbH, "Physica MCR301") with a cone plate appropriate for the viscosity.

The hydrophilization treatment agent composition of the present invention can be directed to various solid surfaces such as hard surfaces, fabric surfaces, skin surfaces, hair surfaces and the like. The hydrophilization treatment agent composition of the present invention is preferably for use on hard surfaces. Examples of the hard surfaces include hard surfaces made of such materials as plastic, ceramic, metal, wood, glass, rubber, carbon materials, and the like. The hard surfaces may be surfaces of hard articles, for example, surfaces of hard articles made of the aforementioned materials. Examples of the plastic include acrylic resin, polyamide, polycarbonate, melamine, polyvinyl chloride, polyester, polystyrene, polyethylene, polypropylene, ABS, FRP (fiber reinforced plastic) and the like. Examples of the metal include alloys such as stainless steel and the like, aluminum, and irons such as automotive steel and the like, etc. Examples of the rubber include natural rubber, diene synthetic rubber and the like. Examples of the wood include wood used for flooring and the like, etc. The wood used for flooring and the like may be surface-treated. The fabric may be either woven fabric or non-woven fabric, and woven fabric is preferable from the viewpoints of the hydrophilization of solid surfaces and the finish of solid surfaces. The fabric is preferably made of synthetic fibers. The fabric is preferably made of hydrophobic fibers. By way of example, the fabric is used as a manufacturing material for textile products.

If solid surfaces are hydrophilized by the hydrophilization treatment agent composition of the present invention and the hydrophilizing method of the present invention, they may have improved anti-fogging properties, antisoiling properties, decontaminating properties, water absorbency and the like. Further, if solid surfaces are hydrophilized by the hydrophilization treatment agent composition of the present invention and the hydrophilizing method of the present invention, they maintain their surface conditions inherent in the materials, such as transparency, smoothness or the like. For example, colorless and transparent glass maintains its transparency.

The hydrophilization treatment agent composition of the present invention may be an anti-fogging agent composition. That is, the present invention provides an anti-fogging agent composition containing component (A), component (B) and water, wherein the molar ratio of component (B) to the total of components (A) and (B), (B)/[(A)+(B)], is 0.1 or more and 0.8 or less.

The hydrophilization treatment agent composition of the present invention may be an antisoiling treatment agent composition. That is, the present invention provides an antisoiling treatment agent composition containing component (A), component (B) and water, wherein the molar ratio of component (B) to the total of components (A) and (B), (B)/[(A)+(B)], is 0.1 or more and 0.8 or less.

The hydrophilization treatment agent composition of the present invention may be a decontaminating treatment agent composition. That is, the present invention provides a decontaminating treatment agent composition containing component (A), component (B) and water, wherein the molar ratio of component (B) to the total of components (A) and (B), (B)/[(A)+(B)], is 0.1 or more and 0.8 or less.

The hydrophilization treatment agent composition of the present invention may be a water absorbency imparting agent composition. That is, the present invention provides a water absorbency imparting agent composition containing component (A), component (B) and water, wherein the molar ratio of component (B) to the total of components (A) and (B), (B)/[(A)+(B)], is 0.1 or more and 0.8 or less.

The matters mentioned in the hydrophilization treatment agent composition of the present invention can be appropriately applied to these compositions. These compositions preferably contain component (C). Further, in these compositions, preferable modes, for example, components (A), (B) and (C) and the contents thereof, etc. are also the same as in the hydrophilization treatment agent composition of the present invention.

The present invention provides a method for producing a hydrophilization treatment agent composition, wherein component (A), component (B) and water are mixed in such a manner that the molar ratio of component (B) to the total of components (A) and (B), (B)/[(A)+(B)], is 0.1 or more and 0.8 or less.

When the hydrophilization treatment agent composition of the present invention contains component (C), provided is a method for producing a hydrophilization treatment agent composition, wherein a composition containing component (C) and water is mixed with a composition containing component (A), component (B) and water, in which the molar ratio of component (B) to the total of components (A) and (B), (B)/[(A)+(B)], is 0.1 or more and 0.8 or less, in such a manner that the molar ratio of component (C) to the total of components (A) and (B), (C)/[(A)+(B)], is preferably 0.2 or more and 4 or less.

When the hydrophilization treatment agent composition of the present invention contains component (C), provided is a method for producing a hydrophilization treatment agent composition, wherein water with a hardness of 4°dH or more and 100°dH or less containing component (C) is mixed with a composition containing component (A), component (B) and water, in which the molar ratio of component (B) to the total of components (A) and (B), (B)/[(A)+(B)], is 0.1 or more and 0.8 or less, in such a manner that the molar ratio of component (C) to the total of components (A) and (B), (C)/[(A)+(B)], is preferably 0.2 or more and 4 or less.

These producing methods are suitable as methods for producing the hydrophilization treatment agent composition of the present invention.

The matters mentioned in the hydrophilization treatment agent composition of the present invention can be appropriately applied to these producing methods.

Here, hardness (°dH) used herein refers to the concentration of calcium and magnesium in water expressed as 1 mg/L (ppm)=about 0.056°dH (1°dH=17.8 ppm) in terms of the $CaCO_3$ equivalent concentration.

The concentration of calcium and magnesium for this hardness is determined by a chelatometric titration method using ethylenediaminetetraacetic acid disodium salt.

A specific method for measuring the hardness of water herein is described below.

<Method for Measuring Hardness of Water>
[Reagent]
    0.01 mol/l EDTA-2Na solution: 0.01 mol/l aqueous solution of disodium ethylenediaminetetraacetate (solution for titration, 0.01 M EDTA-Na2, manufactured by Sigma-Aldrich Co. LLC. (SIGMA-ALDRICH))

Universal BT indicator (product name: Universal BT, manufactured by DOJINDO LABORATORIES)

Ammonia buffer solution for hardness measurement (solution in which 67.5 g of ammonium chloride is dissolved in 570 ml of 28 w/v % ammonia water and the total amount is made up to 1000 ml with deionized water)

[Measurement of Hardness]

(1) 20 ml of water as a sample is collected in a conical beaker with a volumetric pipette.
(2) 2 ml of the ammonia buffer solution for hardness measurement is added.
(3) 0.5 ml of the Universal BT indicator is added. It is checked that the solution after the addition is reddish purple.
(4) While the conical beaker is shaken well, the 0.01 mol/l EDTA-2Na solution is added dropwise from a burette, and the point of time when the sample water turns blue is defined as the end point of the titration.
(5) The total hardness is determined by the following calculation formula:

$$Hardness (°dH) = T \times 0.01 \times F \times 56.0774 \times 100/A$$

T: titration amount of 0.01 mol/l EDTA-2Na solution (mL)
A: sample volume (20 mL, volume of sample water)
F: factor of 0.01 mol/l EDTA 2Na solution The present invention includes use, as a hydrophilization treatment agent, of a composition containing component (A), component (B) and water, wherein the molar ratio of component (B) to the total of components (A) and (B), (B)/[(A)+(B)], is 0.1 or more and 8 or less. In addition, the present invention includes use, for hydrophilizing a solid surface, of a composition containing component (A), component (B) and water, wherein the molar ratio of component (B) to the total of components (A) and (B), (B)/[(A)+(B)], is 0.1 or more and 0.8 or less. The matters mentioned in the hydrophilization treatment agent composition of the present invention can be appropriately applied to these uses. The compositions according to these uses preferably contain component (C). In these uses, preferable modes, such as, for example, specific examples, the contents in the compositions, or the like of components (A), (B) and (C) are the same as in the hydrophilization treatment agent composition of the present invention.

[Method for Hydrophilizing Solid Surface]

The present invention provides a method for hydrophilizing a solid surface, wherein the solid surface is contacted with a treatment liquid containing component (A), component (B) and water, in which the molar ratio of component (B) to the total of components (A) and (B), (B)/[(A)+(B)], is 0.1 or more and 0.8 or less (hereinafter sometimes also referred to as a treatment liquid of the present invention). Component (A), component (B) and the solid surface are the same as those mentioned in the hydrophilization treatment agent composition of the present invention. The treatment liquid of the present invention preferably contains component (C). The matters mentioned in the hydrophilization treatment agent composition of the present invention can be appropriately applied to the method for hydrophilizing a solid surface of the present invention. For example, in the method for hydrophilizing a solid surface of the present invention, preferable modes, such as specific examples, the contents in the treatment liquid, or the like of components (A) and (B) are the same as in the hydrophilization treatment agent composition of the present invention (provided that the hydrophilization treatment agent composition is read as the treatment liquid as necessary).

The treatment liquid of the present invention may be the hydrophilization treatment agent composition of the present invention or may be obtained by mixing the hydrophilization treatment agent composition of the present invention with water.

In the method for hydrophilizing a solid surface of the present invention, the solid surface is preferably a solid surface of a hard article.

In the present invention, it has been found that excellent hydrophilicity can be imparted to solid surfaces such as hard surfaces or the like without impairing the condition of the solid surfaces if components (A) and (B) are applied to the solid surfaces while allowing them to coexist at the predetermined molar ratio.

In the present invention, it is only necessary to create a situation in which components (A) and (B) are applied to a solid surface while allowing them to coexist at the predetermined molar ratio in any of the steps of treating the solid surface. For example, after the solid surface is contacted with a composition containing component (A), component (B) and water, in which the molar ratio of (B)/[(A)+(B)] is less than 0.1, water containing component (B) may be supplied to make (B)/[(A)+(B)] 0.1 or more and 0.8 or less while component (A) remains on the solid surface or while the above composition containing component (A) is in contact with the solid surface, thereby forming the treatment liquid of the present invention and bringing the said treatment liquid into contact with the solid surface.

The treatment liquid of the present invention is a liquid composition containing water and preferably an aqueous solution or an aqueous dispersion from the viewpoint of stability in handling.

The treatment liquid of the present invention that is brought into contact with the solid surface contains component (A) of the present invention in an amount of preferably 0.001 mass % or more, more preferably 0.005 mass % or more and further preferably 0.01 mass % or more, and preferably 10 mass % or less, more preferably 5 mass % or less and further preferably 3 mass % or less from the viewpoints of the hydrophilization of the solid surface and the finish of the solid surface. When the hydrophilization treatment agent composition of the present invention contains component (A) in this range, it can be used as-is as the treatment liquid of the present invention.

In the hydrophilizing method of the present invention, the solid surface is contacted with the treatment liquid of the present invention for preferably 0.1 seconds or more, more preferably 0.5 seconds or more and further preferably 1 second or more, and preferably 90 minutes or less, more preferably 60 minutes or less and further preferably 30 minutes or less from the viewpoints of the hydrophilization of the solid surface and the finish of the solid surface.

The temperature of the treatment liquid of the present invention that is brought into contact with the solid surface is preferably 5° C. or more, more preferably 10° C. or more and more preferably 15° C. or more, and preferably 95° C. or less, more preferably 90° C. or less and more preferably 80° C. or less from the viewpoint of enhancing the hydrophilization performance of the treatment liquid and the viewpoint of the simplicity of the treatment method.

Moreover, in the hydrophilizing method of the present invention, after the solid surface is contacted with the treatment liquid of the present invention, it may be left alone for preferably 10 seconds or more, more preferably 1 minute or more and further preferably 2 minutes or more, and preferably 30 minutes or less, more preferably 15 minutes or less and further preferably 10 minutes or less from the viewpoints of the hydrophilization of the solid surface and the finish of the solid surface. The temperature for leaving it alone is preferably 0° C. or more and 80° C. or less.

In the hydrophilizing method of the present invention, after the solid surface is contacted with the treatment liquid of the present invention, and preferably left alone as mentioned above, the said solid surface can be rinsed with water. With the treatment liquid of the present invention, a hydrophilizing effect is maintained even if the solid surface is rinsed after treated. Therefore, it has a more advantageous effect on objects for which rinsing is desirable. The solid surface can be dried after rinsed. Water used for rinsing is preferably water with the same hardness as the water used for preparing the treatment liquid of the present invention. For example, water with a hardness of 4°dH or more and 100°dH or less can be used for rinsing.

A method for contacting the solid surface with the treatment liquid of the present invention is not particularly limited. Examples thereof include, for example, the following methods (i) to (iii) and the like:
  (i) a method of immersing the solid in the treatment liquid of the present invention;
  (ii) a method of spraying or applying the treatment liquid of the present invention onto the solid surface; and
  (iii) a method of washing the solid surface with the treatment liquid of the present invention in accordance with the usual manner.

In the aforementioned method (i), immersion time is preferably 0.5 minutes or more and more preferably 1 minute or more, and preferably 60 minutes or less and more preferably 50 minutes or less from the viewpoint of enhancing the hydrophilization performance of the treatment liquid of the present invention and the viewpoint of economic efficiency.

In the aforementioned method (ii), as a method for spraying or applying the treatment liquid of the present invention onto the solid surface, an appropriate method can be selected depending on the size (area) of the solid surface or the like. It is preferably a method of spraying the treatment liquid of the present invention onto the solid surface with a spray or the like and thereafter drying. As necessary, it may be rinsed with water after sprayed. In addition, it may be spread thinly with a sponge or the like after sprayed.

The amount of the treatment liquid of the present invention to be sprayed or applied onto the solid surface is, for example, preferably 0.01 mL or more and 1 mL or less per 10 $cm^2$ in the case of the treatment liquid of the present invention in which the content of component (A) of the present invention is 0.1 mass %.

In the aforementioned method (iii), the treatment liquid of the present invention is preferably used in the form of a detergent composition containing components (A) and (B) of the present invention and brought into contact with the solid surface. In the case of the form of such a detergent composition, the pH is preferably 4 or more, and preferably 10 or less and more preferably 8 or less from the viewpoints of safety in handling and the prevention of damage of the solid surface.

As surfactants, those which are mentioned above can be used.

The method for hydrophilizing a solid surface of the present invention may include, for example,
  preparing a treatment liquid by mixing component (A), component (B) and water in such a manner that the molar ratio of component (B) to the total of components (A) and (B), (B)/[(A)+(B)], is 0.1 or more and 0.8 or less and
  contacting the solid surface with the treatment liquid.

In addition, the method for hydrophilizing a solid surface of the present invention may include, for example,
  preparing a treatment liquid by mixing a composition containing components (A) and (B), a composition containing component (C), and water in such a manner that the molar ratio of component (B) to the total of components (A) and (B), (B)/[(A)+(B)], is 0.1 or more and 0.8 or less, and preferably the molar ratio of component (C) to the total of components (A) and (B), (C)/[(A)+(B)], is 0.2 or more and 4 or less, and contacting the solid surface with the treatment liquid. The water used for preparing the treatment liquid may be contained in one of or both the composition containing components (A) and (B) and the composition containing component (C). The treatment liquid is preferably prepared by mixing a composition containing component (A), component (B) and water with a composition containing component (C) and water.

These methods may optionally include rinsing, with water, the solid surface that is contacted with the treatment liquid.

The method for hydrophilizing a solid surface of the present invention may impart anti-fogging properties to solid surfaces. That is, the present invention provides a method of anti-fogging treatment of a solid surface, wherein the solid surface is contacted with a treatment liquid containing component (A), component (B) and water, in which the molar ratio of component (B) to the total of components (A) and (B), (B)/[(A)+(B)], is 0.1 or more and 0.8 or less.

The method for hydrophilizing a solid surface of the present invention may impart antisoiling properties to solid surfaces. That is, the present invention provides a method of antisoiling treatment of a solid surface, wherein the solid surface is contacted with a treatment liquid containing component (A), component (B) and water, in which the molar ratio of component (B) to the total of components (A) and (B), (B)/[(A)+(B)], is 0.1 or more and 0.8 or less.

The method for hydrophilizing a solid surface of the present invention may impart decontaminating properties to solid surfaces. That is, the present invention provides a method of decontaminating treatment of a solid surface, wherein the solid surface is contacted with a treatment liquid containing component (A), component (B) and water, in which the molar ratio of component (B) to the total of components (A) and (B), (B)/[(A)+(B)], is 0.1 or more and 0.8 or less.

The method for hydrophilizing a solid surface of the present invention may impart water absorbency to solid surfaces. That is, the present invention provides a method for imparting water absorbency to a solid surface, wherein the solid surface is contacted with a treatment liquid containing component (A), component (B) and water, in which the molar ratio of component (B) to the total of components (A) and (B), (B)/[(A)+(B)], is 0.1 or more and 0.8 or less.

The matters mentioned in the hydrophilization treatment agent composition and method for hydrophilizing a solid surface of the present invention can be appropriately applied to these methods. The treatment liquid preferably also contains component (C) in these methods. Further, in these compositions, preferable modes, such as, for example, components (A), (B) and (C) and the contents thereof, as well as preferable modes of the treatment liquid, and the like are also the same as in the hydrophilization treatment agent composition and method for hydrophilizing a solid surface of the present invention.

With respect to the aforementioned embodiments, the present invention further discloses the following hydrophilization treatment agent compositions, methods for producing hydrophilization treatment agent compositions, uses, and methods for hydrophilizing solid surfaces.

<1>
A hydrophilization treatment agent composition containing (A) a branched anionic surfactant [hereinafter also referred to as component (A)], (B) a di-long chain hydrocarbon cationic surfactant [hereinafter also referred to as component (B)], and water, wherein a molar ratio of (B) to a total of (A) and (B), (B)/[(A)+(B)], is 0.1 or more and 0.8 or less.

<2>
The hydrophilization treatment agent composition according to <1>, wherein component (A) is an anionic surfactant having a branched chain hydrocarbon group with 10 or more and 30 or less carbons.

<3>
The hydrophilization treatment agent composition according to <1> or <2>, wherein component (A) is an anionic surfactant having a branched chain hydrocarbon group with 10 or more and 30 or less carbons, a sulfate group or a sulfonic acid group.

<4>
The hydrophilization treatment agent composition according to <2> or <3>, wherein the branched chain hydrocarbon group has 16 or more carbons.

<5>
The hydrophilization treatment agent composition according to any one of <2> to <4>, wherein the branched chain hydrocarbon group has 18 or more carbons.

<6>
The hydrophilization treatment agent composition according to any one of <2> to <5>, wherein the branched chain hydrocarbon group has 30 or less carbons.

<7>
The hydrophilization treatment agent composition according to any one of <2> to <6>, wherein the branched chain hydrocarbon group has 28 or less carbons.

<8>
The hydrophilization treatment agent composition according to any one of <2> to <7>, wherein the branched chain hydrocarbon group has 24 or less carbons.

<9>
The hydrophilization treatment agent composition according to any one of <2> to <8>, wherein the branched chain hydrocarbon group has 22 or less carbons.

<10>
The hydrophilization treatment agent composition according to any one of <2> to <9>, wherein the branched chain hydrocarbon group is a branched chain alkyl group, a branched chain alkenyl group or an aryl group having a branched chain alkyl group.

<11>
The hydrophilization treatment agent composition according to any one of <1> to <10>, wherein component (A) is an anionic surfactant represented by the following general formula (A):

(A)

wherein each of $R^{1a}$ and $R^{2a}$ independently represents a hydrocarbon group with 1 or more and 28 or less carbons which may include a substituent or a linking group; X represents a group selected from $SO_3M$, COOM and $OSO_3M$; and M represents a counter ion.

<12>
The hydrophilization treatment agent composition according to <11>, wherein $R^{1a}$ and $R^{2a}$ in the formula (A) are alkyl groups, alkenyl groups or aryl groups.

<13>
The hydrophilization treatment agent composition according to <11> or <12>, wherein $R^{1a}$ and $R^{2a}$ in the formula (A) are alkyl groups or alkenyl groups.

<14>
The hydrophilization treatment agent composition according to any one of <11> to <13>, wherein the total of the numbers of carbons in $R^{1a}$ and $R^{2a}$ in the formula (A) is 9 or more.

<15>
The hydrophilization treatment agent composition according to any one of <11> to <14>, wherein the total of the numbers of carbons in $R^{1a}$ and $R^{2a}$ in the formula (A) is 15 or more.

<16>
The hydrophilization treatment agent composition according to any one of <11> to <15>, wherein the total of the numbers of carbons in $R^{1a}$ and $R^{2a}$ in the formula (A) is 17 or more.

<17>
The hydrophilization treatment agent composition according to any one of <11> to <16>, wherein the total of the numbers of carbons in $R^{1a}$ and $R^{2a}$ in the formula (A) is 29 or less.

<18>
The hydrophilization treatment agent composition according to any one of <11> to <17>, wherein the total of the numbers of carbons in $R^{1a}$ and $R^{2a}$ in the formula (A) is 27 or less.

<19>
The hydrophilization treatment agent composition according to any one of <11> to <18>, wherein the total of the numbers of carbons in $R^{1a}$ and $R^{2a}$ in the formula (A) is 23 or less.

<20>
The hydrophilization treatment agent composition according to any one of <11> to <19>, wherein the total of the numbers of carbons in $R^{1a}$ and $R^{2a}$ in the formula (A) is 21 or less.

<21>
The hydrophilization treatment agent composition according to any one of <11> to <20>, wherein X in the formula (A) is $SO_3M$.

<22>
The hydrophilization treatment agent composition according to any one of <1> to <21>, wherein component (A) is one or more branched anionic surfactants selected from an internal olefin sulfonate salt (hereinafter also referred to as an IOS), a secondary alkane sulfonate salt and a dialkyl sulfosuccinate salt.

<23>
The hydrophilization treatment agent composition according to any one of <1> to <22>, wherein component (A) is one or more branched anionic surfactants selected from an IOS with 10 or more and 30 or less carbons, a secondary alkane sulfonate salt with 10 or more and 22 or less carbons and a dialkyl sulfosuccinate salt whose alkyl groups each have 6 or more and 18 or less carbons.

<24>
The hydrophilization treatment agent composition according to any one of <1> to <23>, wherein component (A) is one or more branched anionic surfactants selected from an IOS.
<25>
The hydrophilization treatment agent composition according to any one of <1> to <24>, wherein component (A) is one or more branched anionic surfactants selected from an IOS with 10 or more and 30 or less carbons.
<26>
The hydrophilization treatment agent composition according to any one of <22> to <25>, wherein the IOS has 10 or more carbons.
<27>
The hydrophilization treatment agent composition according to any one of <22> to <26>, wherein the IOS has 16 or more carbons.
<28>
The hydrophilization treatment agent composition according to any one of <22> to <27>, wherein the IOS has 18 or more carbons.
<29>
The hydrophilization treatment agent composition according to any one of <22> to <28>, wherein the IOS has 30 or less carbons.
<30>
The hydrophilization treatment agent composition according to any one of <22> to <29>, wherein the IOS has 28 or less carbons.
<31>
The hydrophilization treatment agent composition according to any one of <22> to <30>, wherein the IOS has 24 or less carbons.
<32>
The hydrophilization treatment agent composition according to any one of <22> to <31>, wherein the IOS has 22 or less carbons.
<33>
The hydrophilization treatment agent composition according to any one of <22> to <32>, wherein, in the IOS, the proportion of an IOS whose sulfonic acid group is present at position 2 of the carbon chain of the IOS is 5% or more on molar basis or mass basis.
<34>
The hydrophilization treatment agent composition according to any one of <22> to <33>, wherein, in the IOS, the proportion of an IOS whose sulfonic acid group is present at position 2 of the carbon chain of the IOS is 10% or more on molar basis or mass basis.
<35>
The hydrophilization treatment agent composition according to any one of <22> to <34>, wherein, in the IOS, the proportion of an IOS whose sulfonic acid group is present at position 2 of the carbon chain of the IOS is 45% or less on molar basis or mass basis.
<36>
The hydrophilization treatment agent composition according to any one of <22> to <35>, wherein, in the IOS, the proportion of an IOS whose sulfonic acid group is present at position 2 of the carbon chain of the IOS is 30% or less on molar basis or mass basis.
<37>
The hydrophilization treatment agent composition according to any one of <22> to <36>, wherein, in the IOS, the proportion of an IOS whose sulfonic acid group is present at position 1 of the carbon chain of the IOS is 0.2% or more on molar basis or mass basis.
<38>
The hydrophilization treatment agent composition according to any one of <22> to <37>, wherein, in the IOS, the proportion of an IOS whose sulfonic acid group is present at position 1 of the carbon chain of the IOS is 0.5% or more on molar basis or mass basis.
<39>
The hydrophilization treatment agent composition according to any one of <22> to <38>, wherein, in the IOS, the proportion of an IOS whose sulfonic acid group is present at position 1 of the carbon chain of the IOS is 1.0% or more on molar basis or mass basis.
<40>
The hydrophilization treatment agent composition according to any one of <22> to <39>, wherein, in the IOS, the proportion of an IOS whose sulfonic acid group is present at position 1 of the carbon chain of the IOS is 20% or less on molar basis or mass basis.
<41>
The hydrophilization treatment agent composition according to any one of <22> to <40>, wherein, in the IOS, the proportion of an IOS whose sulfonic acid group is present at position 1 of the carbon chain of the IOS is 10% or less on molar basis or mass basis.
<42>
The hydrophilization treatment agent composition according to any one of <22> to <41>, wherein, in the IOS, the proportion of an IOS whose sulfonic acid group is present at position 1 of the carbon chain of the IOS is 5% or less on molar basis or mass basis.
<43>
The hydrophilization treatment agent composition according to any one of <22> to <42>, wherein, in the IOS, the proportion of an IOS whose sulfonic acid group is present at position 1 of the carbon chain of the IOS is 3% or less on molar basis or mass basis.
<44>
The hydrophilization treatment agent composition according to any one of <22> to <43>, wherein, in the IOS, the proportion of an IOS with 16 or more and 24 or less carbons is 50 mass % or more.
<45>
The hydrophilization treatment agent composition according to any one of <22> to <44>, wherein, in the IOS, the proportion of an IOS with 16 or more and 24 or less carbons is 70 mass % or more.
<46>
The hydrophilization treatment agent composition according to any one of <22> to <45>, wherein, in the IOS, the proportion of an IOS with 16 or more and 24 or less carbons is 80 mass % or more.
<47>
The hydrophilization treatment agent composition according to any one of <22> to <46>, wherein, in the IOS, the proportion of an IOS with 16 or more and 24 or less carbons is 90 mass % or more.
<48>
The hydrophilization treatment agent composition according to any one of <22> to <47>, wherein, in the IOS, the proportion of an IOS with 16 or more and 24 or less carbons is 95 mass % or more.
<49>
The hydrophilization treatment agent composition according to any one of <22> to <48>, wherein, in the IOS, the proportion of an IOS with 16 or more and 24 or less carbons is 97 mass % or more.

<50>
The hydrophilization treatment agent composition according to any one of <22> to <49>, wherein, in the IOS, the proportion of an IOS with 16 or more and 24 or less carbons is 100 mass % or less.

<51>
The hydrophilization treatment agent composition according to any one of <22> to <50>, wherein, in the IOS, the proportion of an IOS with 16 or more and 24 or less carbons is 100 mass %.

<52>
The hydrophilization treatment agent composition according to any one of <22> to <51>, wherein the IOS includes a hydroxy alkane sulfonate salt (hereinafter also referred to as an H species) and an olefin sulfonate salt (hereinafter also referred to as an O species), and the molar ratio of the H species to the O species (H species/O species) is more than 50/50.

<53>
The hydrophilization treatment agent composition according to <52>, wherein the molar ratio of the H species to the O species (H species/O species) in the IOS is more than 70/30.

<54>
The hydrophilization treatment agent composition according to <52> or <53>, wherein the molar ratio of the H species to the O species (H species/C species) in the IOS is 95/5 or less.

<55>
The hydrophilization treatment agent composition according to any one of <52> to <54>, wherein the molar ratio of the H species to the O species (H species/C species) in the IOS is 90/10 or less.

<56>
The hydrophilization treatment agent composition according to any one of <1> to <55>, wherein the composition contains component (A) in an amount of 0.001 mass % or more and 60 mass % or less.

<57>
The hydrophilization treatment agent composition according to any one of <1> to <56>, wherein the composition contains component (A) in an amount of 0.005 mass % or more.

<58>
The hydrophilization treatment agent composition according to any one of <1> to <57>, wherein the composition contains component (A) in an amount of 0.01 mass % or more.

<59>
The hydrophilization treatment agent composition according to any one of <1> to <58>, wherein the composition contains component (A) in an amount of 40 mass, or less.

<60>
The hydrophilization treatment agent composition according to any one of <1> to <59>, wherein the composition contains component (A) in an amount of 25 mass % or less.

<61>
The hydrophilization treatment agent composition according to any one of <1> to <60>, wherein the composition contains component (A) in an amount of 10 mass % or less.

<62>
The hydrophilization treatment agent composition according to any one of <1> to <61>, wherein the composition contains component (A) in an amount of 5 mass % or less.

<63>
The hydrophilization treatment agent composition according to any one of <1> to <62>, wherein component (B) is a cationic surfactant having two long chain hydrocarbon groups in a single molecule.

<64>
The hydrophilization treatment agent composition according to any one of <1> to <63>, wherein component (B) is a cationic surfactant having a hydrophobic group composed of two long chain hydrocarbon groups and one hydrophilic group.

<65>
The hydrophilization treatment agent composition according to <63> or <64>, wherein the long chain hydrocarbon groups have 6 or more and 14 or less carbons.

<66>
The hydrophilization treatment agent composition according to any one of <1> to <65>, wherein component (B) is a quaternary ammonium salt cationic surfactant having two hydrocarbon groups with 6 or more and 14 or less carbons [each of which is also referred to as long chain hydrocarbon group (B) hereinafter].

<67>
The hydrophilization treatment agent composition according to any one of <1> to <66>, wherein long chain hydrocarbon group (B) is a hydrocarbon group selected from an aliphatic hydrocarbon group with 6 or more and 14 or less carbons [hereinafter also referred to as aliphatic hydrocarbon group (B1)] and an aromatic hydrocarbon group with 6 or more and 14 or less carbons [hereinafter also referred to as aromatic hydrocarbon group (B2)].

<68>
The hydrophilization treatment agent composition according to <67>, wherein aliphatic hydrocarbon group (B1) is linear.

<69>
The hydrophilization treatment agent composition according to <67> or <68>, wherein aliphatic hydrocarbon group (B1) is a hydrocarbon group selected from an alkyl group and an alkenyl group.

<70>
The hydrophilization treatment agent composition according to <69>, wherein the hydrocarbon group selected from an alkyl group and an alkenyl group is linear.

<71>
The hydrophilization treatment agent composition according to any one of <67> to <70>, wherein aliphatic hydrocarbon group (B1) has 12 or less carbons.

<72>
The hydrophilization treatment agent composition according to any one of <67> to <71>, wherein aliphatic hydrocarbon group (B1) has 10 or less carbons.

<73>
The hydrophilization treatment agent composition according to any one of <67> to <72>, wherein aliphatic hydrocarbon group (B1) has 8 or less carbons.

<74>
The hydrophilization treatment agent composition according to any one of <67> to <73>, wherein aliphatic hydrocarbon group (B1) has 8 carbons.

<75>
The hydrophilization treatment agent composition according to any one of <67> to <74>, wherein aromatic hydrocarbon group (B2) is a hydrocarbon group selected from an aralkyl group and an aryl group.
<76>
The hydrophilization treatment agent composition according to <75>, wherein the aralkyl group is a hydrocarbon group selected from a benzyl group and a phenethyl group.
<77>
The hydrophilization treatment agent composition according to <75> or <76>, wherein the aralkyl group is a benzyl group.
<78>
The hydrophilization treatment agent composition according to any one of <75> to <77>, wherein the aryl group is a hydrocarbon group selected from a phenyl group, a tolyl group and a xylyl group.
<79>
The hydrophilization treatment agent composition according to any one of <75> to <78>, wherein aromatic hydrocarbon group (B2) has 12 or less carbons.
<80>
The hydrophilization treatment agent composition according to any one of <75> to <79>, wherein aromatic hydrocarbon group (B2) has 10 or less carbons.
<81>
The hydrophilization treatment agent composition according to any one of <75> to <80>, wherein aromatic hydrocarbon group (B2) has 8 or less carbons.
<82>
The hydrophilization treatment agent composition according to any one of <75> to <81>, wherein aromatic hydrocarbon group (B2) has 7 or 8 carbons.
<83>
The hydrophilization treatment agent composition according to any one of <75> to <82>, wherein aromatic hydrocarbon group (B2) has 8 carbons.
<84>
The hydrophilization treatment agent composition according to any one of <66> to <83>, wherein long chain hydrocarbon group (B) is a hydrocarbon group selected from an alkyl group, an alkenyl group and an aralkyl group.
<85>
The hydrophilization treatment agent composition according to any one of <1> to <84>, wherein component (B) is a quaternary ammonium salt having two groups each of which is selected from an alkyl group with 6 or more and 14 or less carbons, an alkenyl group with 6 or more and 14 or less carbons and an aralkyl group with 6 or more and 14 or less carbons, the quaternary ammonium salt having at least one linear alkyl group with 6 or more and 14 or less carbons.
<86>
The hydrophilization treatment agent composition according to any one of <1> to <85>, wherein component (B) is a cationic surfactant represented by the following general formula (B):

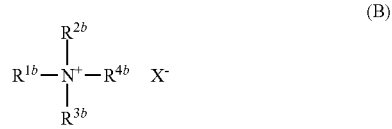

wherein two of $R^{1b}$, $R^{2b}$, $R^{3b}$ and $R^{4b}$ are hydrocarbon groups with 6 or more and 14 or less carbons and the remaining two are hydrocarbon groups with 1 or more and 3 or less carbons; and X is a counter ion.
<87>
The hydrophilization treatment agent composition according to <86>, wherein at least one of $R^{1b}$, $R^{2b}$, $R^{3b}$ and $R^{4b}$ in the general formula (B) is an alkyl group with 6 or more and 14 or less carbons.
<88>
The hydrophilization treatment agent composition according to <86> or <87>, wherein at least one of $R^{1b}$, $R^{2b}$, $R^{3b}$ and $R^{4b}$ in the general formula (B) is a linear alkyl group with 6 or more and 14 or less carbons.
<89>
The hydrophilization treatment agent composition according to any one of <86> to <88>, wherein two of $R^{1b}$, $R^{2b}$, $R^{3b}$ and $R^{4b}$ in the general formula (B) are methyl groups.
<90>
The hydrophilization treatment agent composition according to any one of <1> to <89>, wherein a molar ratio of component (B) to a total of components (A) and (B), (B)/[(A)+(B)], is 0.2 or more.
<91>
The hydrophilization treatment agent composition according to <90>, wherein the molar ratio (B)/[(A)+(B)] is 0.3 or more.
<92>
The hydrophilization treatment agent composition according to <90> or <91>, wherein the molar ratio (B)/[(A)+(B)] is 0.7 or less.
<93>
The hydrophilization treatment agent composition according to any one of <90> to <92>, wherein the molar ratio (B)/[(A)+(B)] is 0.6 or less.
<94>
The hydrophilization treatment agent composition according to any one of <90> to <93>, wherein the molar ratio (B)/[(A)+(B)] is 0.5 or less.
<95>
The hydrophilization treatment agent composition according to any one of <90> to <94>, wherein the molar ratio (B)/[(A)+(B)] is 0.4 or less.
<96>
The hydrophilization treatment agent composition according to any one of <1> to <95>, wherein the composition contains (C) a polyvalent metal ion [hereinafter referred to as component (C)].
<97>
The hydrophilization treatment agent composition according to <96>, wherein component (C) is a divalent or more and trivalent or less metal ion.
<98>
The hydrophilization treatment agent composition according to <96> or <97>, wherein component (C) is a divalent metal ion.
<99>
The hydrophilization treatment agent composition according to any one of <96> to <98>, wherein component (C) is an ion of an element in group 2.
<100>
The hydrophilization treatment agent composition according to any one of <96> to <99>, wherein component (C) is one or more selected from a calcium (Ca) ion and a magnesium (Mg) ion.

<101>
The hydrophilization treatment agent composition according to any one of <96> to <100>, wherein component (C) includes a Ca ion.
<102>
The hydrophilization treatment agent composition according to any one of <96> to <101>, wherein component (C) includes a Ca ion and an Mg ion.
<103>
The hydrophilization treatment agent composition according to <102>, wherein the molar ratio of Ca ion/Mg ion is 5/5 or more.
<104>
The hydrophilization treatment agent composition according to <102> or <103>, wherein the molar ratio of Ca ion/Mg ion is 7/3 or more.
<105>
The hydrophilization treatment agent composition according to any one of <102> to <104>, wherein the molar ratio of Ca ion/Mg ion is 9/1 or less.
<106>
The hydrophilization treatment agent composition according to any one of <96> to <105>, wherein a molar ratio of component (C) to a total of components (A) and (B), (C)/[(A)+(B)], is 0.2 or more and 4 or less.
<107>
The hydrophilization treatment agent composition according to <106>, wherein the molar ratio (C)/[(A)+(B)] is 0.3 or more.
<108>
The hydrophilization treatment agent composition according to <106> or <107>, wherein the molar ratio (C)/[(A)+(B)] is 0.4 or more.
<109>
The hydrophilization treatment agent composition according to any one of <106> to <108>, wherein the molar ratio (C)/[(A)+(B)] is 3 or less.
<110>
The hydrophilization treatment agent composition according to any one of <106> to <109>, wherein the molar ratio (C)/[(A)+(B)] is 2 or less.
<111>
The hydrophilization treatment agent composition according to any one of <1> to <110>, wherein the composition is for use on hard surfaces.
<112>
The hydrophilization treatment agent composition according to any one of <1> to <111>, wherein the composition is an anti-fogging agent composition or a water absorbency imparting agent composition.
<113>
A method for producing a hydrophilization treatment agent composition, wherein (A) a branched anionic surfactant [hereinafter also referred to as component (A)], (B) a di-long chain hydrocarbon cationic surfactant [hereinafter also referred to as component (B)], and water are mixed in such a manner that a molar ratio of component (B) to a total of components (A) and (B), (B)/[(A)+(B)], is 0.1 or more and 0.8 or less.
<114>
A method for producing a hydrophilization treatment agent composition, wherein a composition containing (C) a polyvalent metal ion [hereinafter also referred to as component (C)] and water is mixed with a composition containing component (A), component (B) and water, in which a molar ratio of component (B) to a total of components (A) and (B), (B)/[(A)+(B)], is 0.1 or more and 0.8 or less.
<115>
The method for producing a hydrophilization treatment agent composition according to <114>, wherein a molar ratio of component (C) to the total of components (A) and (B), (C)/[(A)+(B)], is 0.2 or more and 4 or less.
<116>
The method for producing a hydrophilization treatment agent composition according to <115>, wherein the hardness of the water is 4°dH or more and 100°dH or less.
<117>
A method for producing a hydrophilization treatment agent composition, wherein water with a hardness of 4°dH or more and 100°dH or less containing component (C) is mixed with a composition containing component (A), component (B) and water, in which a molar ratio of component (B) to a total of components (A) and (B), (B)/[(A)+(B)], is 0.1 or more and 0.8 or less, in such a manner that a molar ratio of component (C) to the total of components (A) and (B), (C)/[(A)+(B)], is 0.2 or more and 4 or less.
<118>
Use, as a hydrophilization treatment agent, of a composition containing (A) a branched anionic surfactant [hereinafter also referred to as component (A)], (B) a di-long chain hydrocarbon cationic surfactant [hereinafter also referred to as component (B)], and water, in which a molar ratio of component (B) to a total of components (A) and (B), (B)/[(A)+(B)], is 0.1 or more and 0.8 or less.
<119>
Use, for hydrophilizing a solid surface, of a composition containing component (A), component (B) and water, in which a molar ratio of component (B) to a total of components (A) and (B), (B)/[(A)+(B)], is 0.1 or more and 0.8 or less.
<120>
A method for hydrophilizing a solid surface, wherein the solid surface is contacted with a treatment liquid [hereinafter also referred to as treatment liquid (I)] containing (A) a branched anionic surfactant [hereinafter also referred to as component (A)], (B) a di-long chain hydrocarbon cationic surfactant [hereinafter also referred to as component (B)], and water, in which a molar ratio of component (B) to a total of components (A) and (B), (B)/[(A)+(B)], is 0.1 or more and 0.8 or less.
<121>
The method for hydrophilizing a solid surface according to <120>, wherein the solid surface is a solid surface of a hard article.
<122>
The method for hydrophilizing a solid surface according to <120> or <121>, wherein the solid surface is rinsed with water after the solid surface is contacted with treatment liquid (I).
<123>
The method for hydrophilizing a solid surface according to any one of <120> to <122>, wherein treatment liquid (I) is obtained by mixing the hydrophilization treatment agent composition according to any one of <1> to <112> with water.
<124>
The method for hydrophilizing a solid surface according to any one of <120> to <123>, wherein treatment liquid (I) contains (C) a polyvalent metal ion [hereinafter also referred to as component (C)].
<125>
The method for hydrophilizing a solid surface according to <124>, wherein component (C) is a divalent metal ion.

<126>
The method for hydrophilizing a solid surface according to <124> or <125>, wherein a molar ratio of component (C) to the total of components (A) and (B), (C)/[(A)+(B)], is 0.2 or more and 4 or less.

<127>
The method for hydrophilizing a solid surface according to any one of <124> to <126>, wherein treatment liquid (I) is obtained by mixing a composition containing component (A), component (B) and water with a composition containing component (C) and water.

EXAMPLES

Production Example 1 (Production of $C_{18}$-IOS-K)

7,000 g of 1-octadecanol (manufactured by Kao Corporation, "KALCOL 8098") and 700 g of γ-alumina (manufactured by Strem Chemicals, Inc.) as a catalyst were prepared in a flask with a stirrer, and the reaction was carried out under stirring at 280° C. with nitrogen (7,000 ml/min.) circulating in the system, thereby obtaining a crude internal olefin. The crude internal olefin was distilled at 148-158° C. and 0.5 mmHg to obtain an internal olefin with 18 carbons with an olefin purity of 100%. The internal olefin was placed in a thin-film sulfonation reactor (inner diameter: 14 mmφ, length: 4 m), and using a sulfur trioxide gas with an $SO_3$ concentration of 2.8 volume %, the sulfonation reaction was carried out under the condition that cooling water at 20° C. was passed through an outer jacket of the reactor. The reaction molar ratio ($SO_3$/internal olefin) was set at 1.09.

The resultant sulfonated product was added to a potassium hydroxide aqueous solution equivalent to 1.2 molar times the theoretical acid number, and neutralized at 30° C. for 1 hour with stirring. The neutralized product was hydrolyzed by heating in an autoclave at 160° C. for 1 hour to obtain a crude product of an internal olefin sulfonate potassium salt.

300 g of the crude product and 300 mL of ethanol were placed in a separatory funnel, and 300 mL of petroleum ether was added per time to extract and remove oil-soluble impurities. At this time, components such as sodium sulfate and the like which were precipitated at the oil-water interface due to the addition of ethanol were also separated and removed from the water phase by oil-water separation operation, and this operation was carried out three times. The water phase side was evaporated to dryness to obtain a potassium salt of an internal olefin sulfonate with 18 carbons ($C_{18}$-IOS-K).

The molar mass distribution of positions at which sulfonic acid groups were present in the $C_{18}$-IOS-K was as follows: position 1: 1.6%, position 2: 25.1% and positions 3-9: 73.3%. The molar ratio of an H species to an O species (H species/O species) was 80/20.

Production Example 2 (Production of $C_{16}$-IOS-K)

A potassium salt of an internal olefin sulfonate with 16 carbons ($C_{16}$-IOS-K) was obtained in the same manner as in Production Example 1, except that 1-hexadecanol was used instead of 1-octadecanol. The molar mass distribution of positions at which sulfonic acid groups were present in the C6-IOS-K was as follows: position 1: 0.5%, position 2: 19.9% and positions 3-9: 79.6%. The molar ratio of an H species to an O species (H species/O species) was 80/20.

Production Example 3 (Preparation of Hard Water Stock Solution)

83.32 g of calcium chloride ($CaCl_2$), manufactured by FUJIFILM Wako Pure Chemical Corporation, Wako grade 1) and 36.99 g of magnesium chloride hexahydrate ($MgCl_2.6H_2O$, manufactured by FUJIFILM Wako Pure Chemical Corporation, Wako grade 1) were mixed with ion exchange water such that the solution volume is 1 L, thereby obtaining 5000°dH hard water. The molar ratio of Ca to Mg (Ca/Mg) is 8/2. This 5000°dH hard water was used as hard water for each test by appropriately diluting with ion exchange water as a stock solution.

Examples 1 to 14 and Comparative Examples 1 to 2

(1) Preparation of Hydrophilization Treatment Agent Composition

Any component (A) or (A') and any component (B) or (B') shown below were dissolved in ion exchange water to be present in predetermined concentrations and at a predetermined molar ratio. The hardwater stock solution in Production Example 3 was added to the mixture to obtain a predetermined molar ratio by a Ca ion and an Mg ion, which were component (C). The mixture was stirred for 15 minutes under the conditions of a liquid temperature of 25° C. and 70 rpm, thereby obtaining a hydrophilization treatment agent composition in Table 1. The total concentration of component (A) or (A') and component (B) or (B') was 1000 ppm in all resultant hydrophilization treatment agent compositions. Note that, in Table 1, the molar ratios are shown for component (A') as component (A) and for component (B') as component (B).

<Component (A)>
  $C_{18}$-IOS-K: the potassium salt of an internal olefin sulfonate with 18 carbons produced in Production Example 1
  C16-IOS-K: the potassium salt of an internal olefin sulfonate with 16 carbons produced in Production Example 2
  SAS: a sodium alkane (with 15 carbons) sulfonate (manufactured by Kao Corporation, "LATEMUL PS")
  DASS: di-2-ethylhexyl sulfosuccinate sodium salt (manufactured by Tokyo Chemical Industry Co., Ltd., "Bis (2-ethylhexyl)Sulfosuccinate Sodium salt")
<Component (A')>
  ES: a sodium polyoxyethylene (average number of added moles 2) linear alkyl (with 12 carbons) ether sulfate (manufactured by Kao Corporation, "EMAL 270J")
<Component (B)>
  DC8DMAB: dioctyl dimethyl ammonium bromide (manufactured by Tokyo Chemical Industry Co., Ltd., "Dimethyldioctylammonium Bromide")
  C8BAC: octyl dimethyl benzalkonium chloride (2) Evaluation
(2-1) Evaluation of Hydrophilization Surfacing An entire test piece was immersed in 500 mL of each hydrophilization treatment agent composition, which was stirred for 15 minutes under the conditions of a liquid temperature of 25° C. and 70 rpm to perform the hydrophilization treatment. Rinsing hard water containing component (C) in the same concentration as in the hydrophilization treatment agent composition was prepared from the hard water stock solution and ion exchange water. The entire test piece was immersed in 500 mL of the rinsing hard water, and rinsed for 1 minute at a liquid temperature of 25° C. and 70 rpm. This rinsing was performed twice. After rinsed, the test piece was dried at room temperature overnight.

The static contact angle relative to ion exchange water was measured on the surface of the treated portion of the dried test piece using an automatic contact angle meter, "DM-501" (manufactured by Kyowa Interface Science Co., Ltd.) under the conditions of an added amount of ion exchange water of 1 μL and 30 seconds after the addition. Measurements were made at three to five arbitrary locations on a single test piece, and the average value of the measurement values was used. The smaller the contact angle is, the more excellent the hydrophilization performance is. The results are shown in Table 1.

The following test pieces were used.

Model skin: BIOSKIN Plate #WHITE manufactured by Beaulax Co., Ltd.
Polypropylene: PP manufactured by Engineering Test Service Co., Ltd.
Polyester: PETP manufactured by Engineering Test Service Co., Ltd.
Stainless steel: SUS430 manufactured by Engineering Test Service Co., Ltd.
Glass: a glass plate manufactured by Yugenkaisha Akebono Shokai (four edges were chamfered)

(2-2) Evaluation of Finish of Test Pieces (Glass and Polyester)

For the glass and polyester test pieces for which hydrophilization surfacing was evaluated in the above (2-1), the transmittance at 600 nm was measured using an automatic spectrophotometer U-2910 (manufactured by Hitachi High-Tech Science Corporation). The transmittance was measured at five arbitrary locations, and the average value was adopted. The transmittance (average value) is shown in Table 1 as a relative value taking the transmittance for an untreated test piece as 100% (reference). The larger a numeral of the transmittance in the table is, the better the finish is, without loss of the inherent transparency of glass and polyester.

(2-3) Formulation Stability

In preparing a hydrophilization treatment agent composition in the above (1), the condition of component (A) or (A') and component (B) or (B') was visually observed when they were dissolved in ion exchange water to be present in predetermined concentrations to evaluate the formulation stability according to the following criteria. The results are shown in Table 1.

✓: fluid, and having no significant precipitate
x: poorly fluid, and having the occurrence of precipitate and difficult to use for hydrophilization treatment

TABLE 1

| | | Hydrophilization treatment agent composition | | | | Molar ratio | |
|---|---|---|---|---|---|---|---|
| | | (A) | | (B) | | | |
| | | Type | Mol % | Type | Mol % | (C) | (B)/[(A) + (B)] | (C)/[(A) + (B)] |
| Example | 1 | C18-IOS-K | 50 | DC8DMAB | 50 | Ca ion and | 0.5 | 1 |
| | 2 | C18-IOS-K | 60 | DC8DMAB | 40 | Mg ion: in | 0.4 | 1 |
| | 3 | C18-IOS-K | 60 | C8BAC | 40 | the amount | 0.4 | 1 |
| | 4 | C18-IOS-K | 70 | DC8DMAB | 30 | that makes | 0.3 | 1 |
| | 5 | C18-IOS-K | 90 | DC8DMAB | 10 | molar ratio | 0.1 | 1 |
| | 6 | C16-IOS-K | 50 | C8BAC | 50 | (C)/[(A) + | 0.5 | 1 |
| | 7 | SAS | 60 | DC8DMAB | 40 | (B)] those | 0.4 | 1 |
| | 8 | DASS | 60 | DC8DMAB | 40 | in the | 0.4 | 1 |
| | 9 | C18-IOS-K | 60 | DC8DMAB | 40 | columnus | 0.4 | 0 |
| | 10 | C18-IOS-K | 60 | DC8DMAB | 40 | | 0.4 | 0.05 |
| | 11 | C18-IOS-K | 60 | DC8DMAB | 40 | | 0.4 | 0.25 |
| | 12 | C18-IOS-K | 60 | DC8DMAB | 40 | | 0.4 | 2 |
| | 13 | C18-IOS-K | 60 | C8BAC | 40 | | 0.4 | 4 |
| | 14 | C18-IOS-K | 40 | DC8DMAB | 60 | | 0.6 | 1 |
| Comparative | 1 | ES | 60 | DC8DMAB | 40 | | 0.4 | 1 |
| Example | 2 | | | DC8DMAB | 100 | | 1.0 | 0 |
| | | Untreated | | | | | | |

| | | Evaluation | | | | | | | |
|---|---|---|---|---|---|---|---|---|---|
| | | Contact angle (°) | | | | | Transmittance (%) | | Formulation |
| | | Model skin | Polypropylene | Polyester | Stainless steel | Glass | Glass | Polyester | stability |
| Example | 1 | 30 | 28 | 18 | 23 | 23 | 99.6 | 99.8 | ✓ |
| | 2 | 32 | 17 | 11 | 24 | 14 | 99.5 | 99.4 | ✓ |
| | 3 | 86 | 31 | 6 | 18 | 24 | 99.6 | 99.6 | ✓ |
| | 4 | 89 | 25 | 14 | 67 | 23 | 99.5 | 99.1 | ✓ |
| | 5 | 89 | 84 | 15 | 61 | 24 | 99.0 | 98.9 | ✓ |
| | 6 | 21 | 19 | 9 | 7 | 29 | 99.7 | 99.4 | ✓ |
| | 7 | 73 | 41 | 12 | 33 | 25 | 98.0 | 97.8 | ✓ |
| | 8 | 81 | 77 | 18 | 29 | 28 | 99.1 | 99.1 | ✓ |
| | 9 | 89 | 96 | 76 | 74 | 37 | 99.3 | 99.0 | ✓ |
| | 10 | 87 | 93 | 70 | 70 | 31 | 99.3 | 99.0 | ✓ |
| | 11 | 63 | 65 | 18 | 20 | 24 | 99.8 | 99.6 | ✓ |
| | 12 | 30 | 16 | 10 | 28 | 14 | 98.1 | 98.1 | ✓ |
| | 13 | 30 | 18 | 11 | 25 | 14 | 88.0 | 84.0 | ✓ |
| | 14 | 89 | 89 | 66 | 62 | 20 | 96.0 | 95.9 | ✓ |

TABLE 1-continued

| Comparative Example | 1 | 106 | 98 | 77 | 75 | 34 | 99.7 | 99.0 | ✓ |
|---|---|---|---|---|---|---|---|---|---|
| | 2 | 108 | 100 | 90 | 77 | 38 | 99.8 | 99.9 | ✓ |
| | | 108 | 104 | 87 | 78 | 39 | — | — | — |

The invention claimed is:

1. A hydrophilization treatment agent composition comprising (A) a branched anionic surfactant, (B) a di-long chain hydrocarbon cationic surfactant, and water, wherein:
a molar ratio of (B) to a total of (A) and (B), (B)/[(A)+(B)], is 0.1 or more and 0.8 or less;
(A) is one or more branched anionic surfactants selected from the group consisting of an internal olefin sulfonate salt, a secondary alkane sulfonate salt and a dialkyl sulfosuccinate salt; and
(B) is a cationic surfactant represented by the following general formula (B):

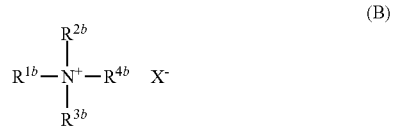

(B)

wherein two of $R^{1b}$, $R^{2b}$, $R^{3b}$ and $R^{4b}$ are hydrocarbon groups with 6 or more and 14 or less carbons and the remaining two are hydrocarbon groups with 1 or more and 3 or less carbons; and $X^-$ is a counter ion.

2. The hydrophilization treatment agent composition according to claim 1, wherein the composition further comprises (C) a polyvalent metal ion.

3. The hydrophilization treatment agent composition according to claim 2, wherein (C) is a divalent metal ion.

4. The hydrophilization treatment agent composition according to claim 2, wherein a molar ratio of (C) to the total of (A) and (B), (C)/[(A)+(B)], is 0.2 or more and 4 or less.

5. The hydrophilization treatment agent composition according to claim 1, wherein the composition comprises (A) in an amount of 0.001 mass % or more and 60 mass % or less.

6. The hydrophilization treatment agent composition according to claim 1, wherein the composition is for use on hard surfaces.

7. A method for hydrophilizing a solid surface, comprising contacting the solid surface with the hydrophilization treatment agent composition of claim 1.

8. The hydrophilizing method according to claim 7, wherein the hydrophilization treatment agent composition further comprises (C) a polyvalent metal ion.

9. The hydrophilizing method according to claim 8, wherein (C) is a divalent metal ion.

10. The hydrophilizing method according to claim 8, wherein a molar ratio of (C) to the total of (A) and (B), (C)/[(A)+(B)], is 0.2 or more and 4 or less.

11. The hydrophilizing method according to claim 8, wherein the hydrophilization treatment agent composition is obtained by mixing a composition comprising the component (A), the component (B), and water, with a composition comprising the component (C) and water.

12. The method for hydrophilizing a solid surface according to claim 7, wherein the solid surface is a solid surface of a hard article.

13. The method for hydrophilizing a solid surface according to claim 7, wherein the solid surface is rinsed with water after the solid surface is contacted with the hydrophilization treatment agent composition.

* * * * *